US007628358B2

(12) United States Patent
Ackermann et al.

(10) Patent No.: US 7,628,358 B2
(45) Date of Patent: Dec. 8, 2009

(54) WING PANEL STRUCTURE

(75) Inventors: James F. Ackermann, Woodinville, WA (US); Richard B. Tanner, Seattle, WA (US); Ian C. Burford, Duvall, WA (US); Thomas V. Gendzwill, Bellevue, WA (US)

(73) Assignee: The Boeing Company, Irvine, CA (US)

( * ) Notice: Subject to any disclaimer, the term of this patent is extended or adjusted under 35 U.S.C. 154(b) by 279 days.

(21) Appl. No.: 11/553,017

(22) Filed: Oct. 26, 2006

(65) Prior Publication Data

US 2008/0099613 A1 May 1, 2008

(51) Int. Cl.
*B64C 3/20* (2006.01)
(52) U.S. Cl. .............................. 244/123.13; 244/123.3; 244/123.5
(58) Field of Classification Search .......... 244/123.1–3, 244/123.5–8, 123.13–14, 133, 131
See application file for complete search history.

(56) References Cited

U.S. PATENT DOCUMENTS

| | | | | |
|---|---|---|---|---|
| 2,382,358 | A | * | 8/1945 | Watter ........................ 244/131 |
| 3,058,704 | A | * | 10/1962 | Bergstedt ..................... 244/119 |
| 4,344,995 | A | * | 8/1982 | Hammer ...................... 428/61 |
| 4,542,056 | A | * | 9/1985 | Anglin et al. ................ 428/116 |
| 4,599,255 | A | * | 7/1986 | Anglin et al. ................. 428/73 |
| 4,667,905 | A | * | 5/1987 | Hamm et al. ........... 244/123.13 |
| 5,735,486 | A | | 4/1998 | Piening et al. |
| 5,866,272 | A | * | 2/1999 | Westre et al. ................ 428/593 |
| 6,355,337 | B1 | | 3/2002 | Piening et al. |
| 7,115,323 | B2 | * | 10/2006 | Westre et al. ................ 428/593 |
| 7,325,771 | B2 | | 2/2008 | Stulc et al. |
| 2005/0013694 | A1 | | 1/2005 | Kovalsky et al. |
| 2005/0112394 | A1 | * | 5/2005 | Pham et al. .................. 428/544 |

FOREIGN PATENT DOCUMENTS

EP 0976650 2/2000

OTHER PUBLICATIONS

Partial International Search Report, corresponding to International Patent Application No. PCT/US2007/016377, dated Jan. 9, 2009.
International Search Report, corresponding to International Patent Application No. PCT/US2007/016377, dated May 6, 2009.
Written Opinion, corresponding to International Patent Application No. PCT/US2007/016377, dated May 6, 2009.
Flabel, Jean-Claude. "Practical Stress AnalysisTm for Design Engineers: Design and Analysis of Aerospace Vehicle Structures." Lake City Publishing Company, 1997, pp. 366-371.
Mccarthy, Michael. "Bojcas: Bolted Joints in Composite Aircraft Structures." Air & Space Europe, vol. 3, No. 3/4, 2001, pp. 139-142.

(Continued)

*Primary Examiner*—Michael R Mansen
*Assistant Examiner*—Michael Kreiner
(74) *Attorney, Agent, or Firm*—Charles L. Moore; Moore & Van Allen, PLLC

(57) ABSTRACT

A wing panel structure for an aerospace vehicle or the like may include an outer layer of material having a predetermined thickness. A core structure may be placed on at least a portion of the outer layer of material. An inner layer of material may be placed at least on the core structure. The inner layer of material may have a selected thickness less than the predetermined thickness of the outer layer of material.

34 Claims, 4 Drawing Sheets

OTHER PUBLICATIONS

Niu, Michael C.Y. "Composite Airframe Structures." Conmilit Press Ltd., 1992, p. 573.

Niu, Michael C.Y. "Airframe Structural Design." Hong Kong Conmilit Press Ltd., 1999, Second Edition, pp. 256-263.

* cited by examiner

WING PANEL STRUCTURE

BACKGROUND OF THE INVENTION

The present invention relates to aircraft, aerospace vehicles or the like and more particularly to a wing panel structure for an aircraft or aerospace vehicle.

Aircraft structures such as fuselages, wings and other components should be as light weight as possible but able to carry many times the loads and stresses expected during normal operations. Additionally, the structures need to be of a size and shape that minimizes aero drag for most efficient operation and fuel savings. To minimize aero drag, outboard wing sections and panels should have a very shallow depth or low profile but must also be capable of carrying high loads. The shallow depth limits access to the inside of the wing panel. Typical wing structures utilize stringers attached to the main skin of the aircraft to add stiffness. Stringers require extra depth which can increase aero drag. Additionally, stringers are separate parts that must be bonded or bolted to the main skin, which increases design and manufacturing costs.

BRIEF SUMMARY OF THE INVENTION

In accordance with an embodiment of the present invention, a wing panel structure for an aerospace vehicle or the like may include an outer layer of material having a predetermined thickness. A core structure may be placed on at least a portion of the outer layer of material. An inner layer of material may be placed at least on the core structure. The inner layer of material may have a selected thickness less than the predetermined thickness of the outer layer of material.

In accordance with another embodiment of the present invention, a wing panel structure for an aerospace vehicle or the like may include an outer layer of material having a predetermined thickness. A core structure may be placed on a portion of the outer layer of material and an inner layer of material may be formed at least on the core structure. A stiffener may be placed on another portion of the outer layer and a support rib may be placed on the outer layer of material between the stiffener and an assembly including the core structure and the inner layer of material.

In accordance with another embodiment of the present invention, an aerospace vehicle may include a fuselage and a wing extending from the fuselage. The wing may include a plurality of wing panel structures. Each wing panel structure may include an outer layer of material having a predetermined thickness. A core structure may be placed on at least a portion of the outer layer of material. An inner layer of material may be formed at least on the core structure. The inner layer of material may have a selected thickness less than the predetermined thickness of the outer layer of material.

In accordance with another embodiment of the present invention, a method of making a wing panel structure may include forming an outer layer of material having a predetermined thickness and placing a core structure on at least a portion of the outer layer of material. The method may also include forming an inner layer of material disposed at least on the core structure, wherein the inner layer of material has a selected thickness less than the predetermined thickness of the outer layer of material.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

Figure 1:
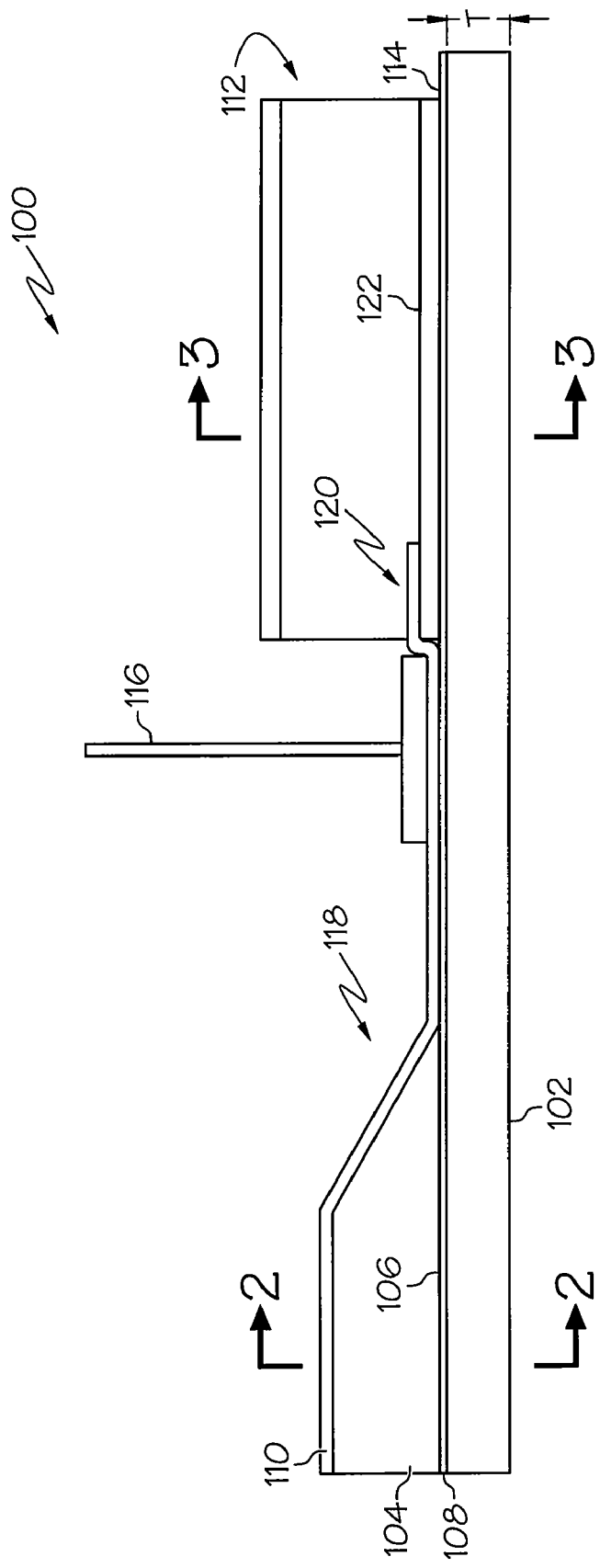
FIG. 1 is a side elevation view of a wing panel structure in accordance with an embodiment of the present invention.
Figure 2:
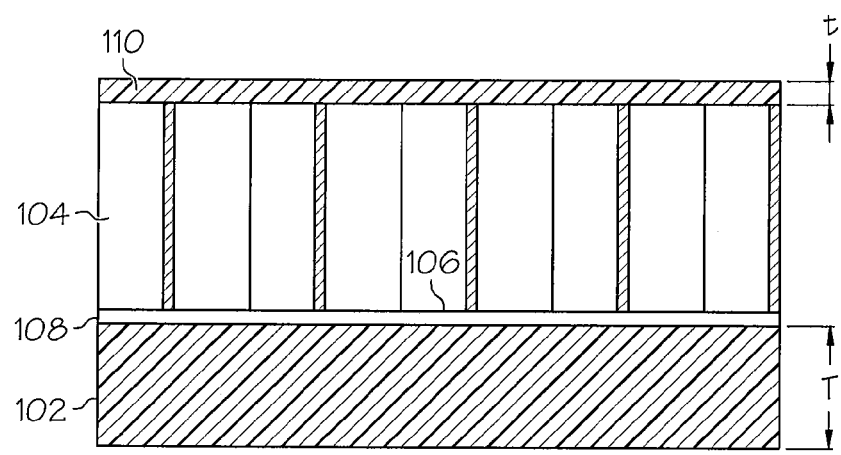
FIG. 2 is a cross-sectional view of the wing panel structure of FIG. 1 taken along lines 2-2.

FIG. 1 is a side elevation view of a wing panel structure 100 in accordance with an embodiment of the present invention. The wing panel structure 100 may be used for a wing of an aircraft, aerospace vehicle or the like. Referring also to FIG. 2, FIG. 2 is a cross-sectional view of the wing panel structure 100 of FIG. 1 taken along lines 2-2. The wing panel structure 100 may include an outer layer 102 of material having a predetermined thickness "T." The outer layer 102 may include a structure to predominantly support or carry the bulk of the wing load. Accordingly, the outer layer 102 of material may include a multiplicity of plies of material. The material may include a multiplicity of epoxy unidirectional tape plies or similar material to provide a structure to predominantly support any loading on a wing in which the wing panel structure 100 is incorporated. The multiplicity of plies of material of the outer layer 102 may be cured and processed to a higher strength specification than other components of the wing panel structure. The higher strength specification may typically involve curing at a temperature between about 300 and about 400 degrees Fahrenheit (F) and a pressure between about 80 and about 100 psi. Accordingly, the multiplicity of plies of the outer layer 102 may be cured and processed before other components of the wing panel structure 100 are deposited or formed. In another embodiment of the present invention described in more detail below, the entire wing panel structure 100 may be assembled and then cured to the higher strength specification.

The wing panel structure 100 may also include a core structure 104 placed or deposited on at least a portion 106 of the outer layer 102. The core structure 104 may be a honeycomb type structure or similar light weight structure to add support to outer layer 102 while permitting the profile of this portion of a wing to be minimal for reduced aero drag but maximum strength. The honeycomb type structure for core 104 may be a composite material or similar material as is known in the aerospace industry.

The wing panel structure 100 may also include a layer 108 of fiberglass, titanium, aluminum, copper or other non-destructive inspection (NDI) reflective material or the like disposed or formed on the outer layer 102. The layer 108 of NDI reflective material may facilitate inspection of the wing panel structure, such as confirming the integrity of the bonds between the multiplicity of plies in layer 102 and other important structural characteristics of the wing panel 100.

An inner layer 110 of material may be deposited or formed at least on the core structure 104. As illustrated in FIG. 1, the inner layer may also be deposited on the outer layer 102 or layer 108 of NDI reflective material. The inner layer 110 may include a plurality of plies of fabric. The plurality of plies of fabric may be aerospace quality carbon fiber fabric or similar material. The inner layer 110 or plurality of plies of fabric may be processed at a temperature of between about 200 and about 300 degrees F. and a pressure of between about 40 and about 50 psi. As best shown in FIG. 2, the inner layer 110 may have a selected thickness "t" that is less than the predetermined thickness "T" of the outer layer 102 of material. As previously discussed, the outer layer 102 is expected to predominantly support the wing load. The inner layer 110 having fewer plies of material reduces the weight and cost of manufacturing the wing panel 100. The outer layer 102 plies of material may be laid by an automated machine. The inner layer 110 plies may be laid by hand or by machine.

Figure 3:
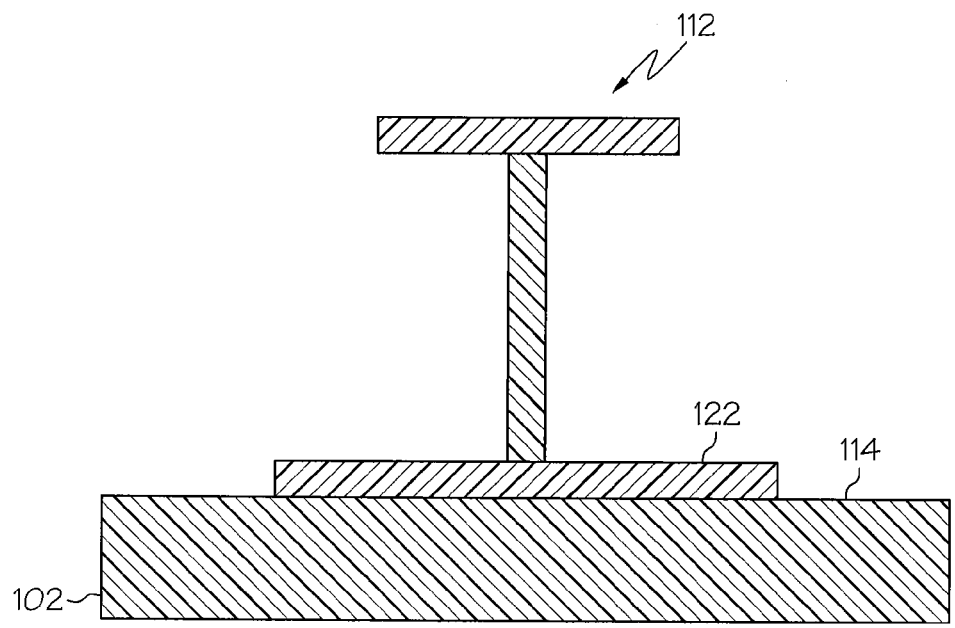
FIG. 3 is a cross-sectional view of the wing panel structure of FIG. 1 taken along lines 3-3.

Referring also to FIG. 3, FIG. 3 is a cross-sectional view of the wing panel structure 100 of FIG. 1 taken along lines 3-3. The wing panel structure 100 may also include a stiffener 112. The stiffener 112 may be formed or deposited on the outer layer 102 or NDI layer 108 at another portion 114 of the wing panel 100. The portion 106 of the wing panel 100 may be an outboard portion of a wing where a much smaller wing profile is desired to reduce aero drag but still provide sufficient strength to handle in excess of any expected wing loads. The other portion 114 may be an inboard portion of the wing where the wing profile can be larger. The stiffener 112 may be an "I" section stiffener, a "T" section stiffener or similar structural member. The stiffener may be a composite material or other lightweight high strength material.

The wing panel structure 100 may also include a support rib 116. The support rib 116 may be formed or deposited on the outer layer 102 of material or on the NDI layer 108. The support rib 116 may be disposed between the stiffener 112 and an assembly 118 including the core structure 104 and the inner layer 110. The support rib 116 may be a composite material or other lightweight, high strength material. In an embodiment of the present invention, the inner layer 110 may extend under the rib 116 and may lap over a portion 120 of a bottom flange 122 of the stiffener 112. The rib 116 may be joined or attached to the inner layer 110 and the inner layer 110 may be joined or integrally formed with the portion 120 of the bottom flange 122 during curing or processing.

Figure 4:
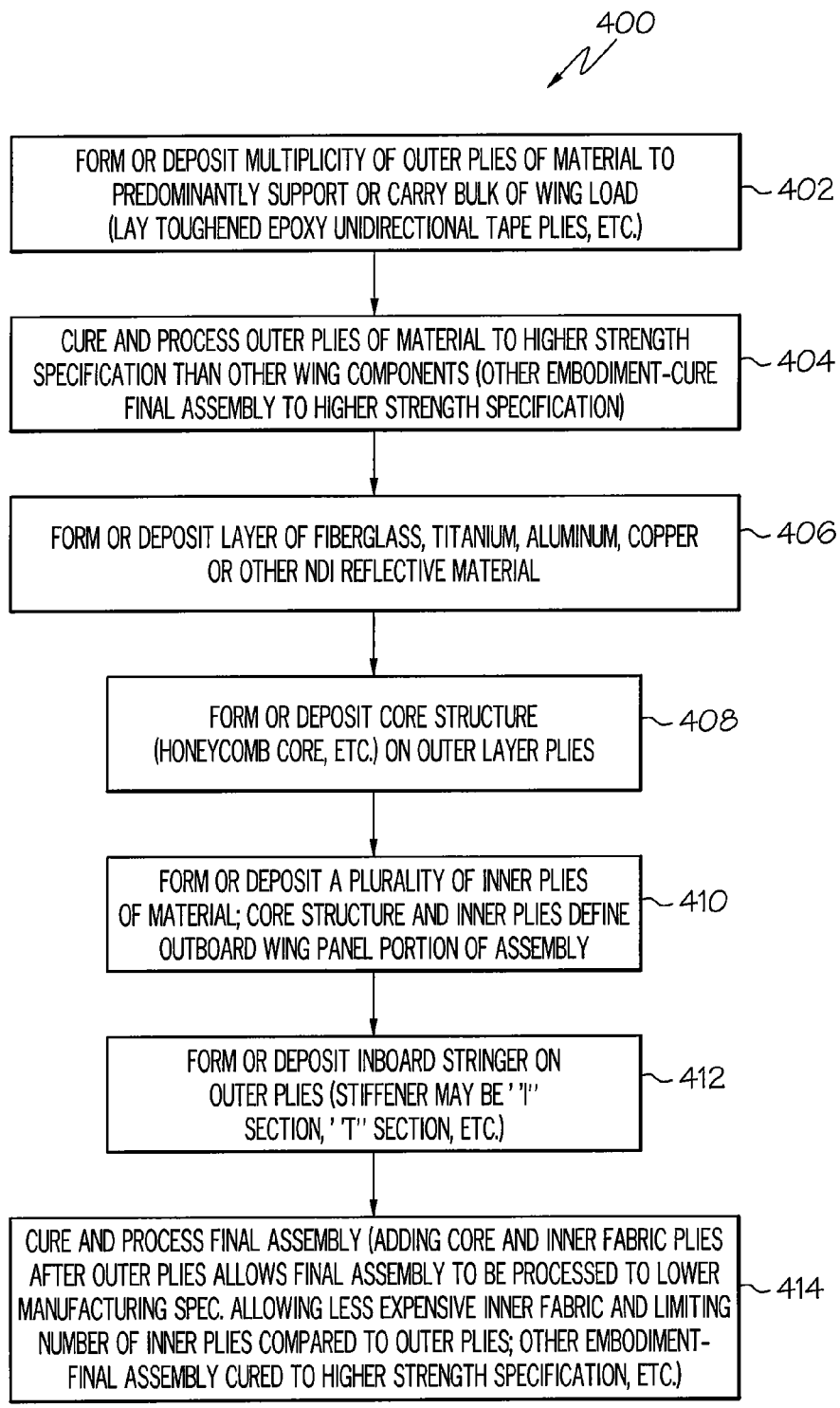
FIG. 4 is a flow chart of an example of a method for making a wing panel structure in accordance with an embodiment of the present invention.

FIG. 4 is a flow chart of an example of a method 400 for making a wing panel structure in accordance with an embodiment of the present invention. The method 400 may be used to make the wing panel structure 100 of FIG. 1. In block 402, a multiplicity of plies of material may be formed or deposited on a tool surface or the like. As previously discussed, the plies of material may be deposited or formed to predominantly support or carry the bulk of the wing load. The multiplicity of plies may be deposited by an automated machine. The multiplicity of plies may be toughened epoxy unidirectional tape plies or similar tape plies that may be laid by an automated tape laying machine or the like.

In block 404, the outer plies of material may be cured and processed to a high strength specification. As previously discussed, the higher strength specification may typically involve curing at a temperature between about 300 and about 400 degrees F. and a pressure between about 80 and about 100 psi. In another embodiment of the present invention, the wing panel structure may be substantially completely assembled and then may be cured and processed in one step as described below.

In block 406, a layer of fiberglass, titanium, aluminum, copper or other NDI reflective material may be formed or deposited similar to that previously discussed.

In block 408, a core structure or assembly may be formed or deposited on the outer layer or outer layer of plies. As previously discussed, the core structure may be a honeycomb type structure or assembly, or other light weight high strength structure.

In block 410, a plurality of inner plies of material may be formed or deposited. The inner plies may be a selected number of plies of a fabric. As previously discussed, the inner plies or layer may have a thickness substantially less than the outer layer or plies. The core structure and the inner layer or plies may define an outboard wing panel portion of a wing panel assembly, similar to section or portion 106 in FIG. 1.

In block 412, a stringer or inboard stringer or stiffener may be formed or deposited. The stringer or stiffener may be an "I" section or "T" section stiffener or stringer, similar to stiffener or stringer 112 of FIG. 1 or some other support structure.

In block 414, the final assembly of the wing panel may be cured and processed. Adding the core structure and inner fabric plies after the outer plies allows the final assembly to be processed to lower manufacturing specifications which allows less expensive inner fabric and a limiting of the number of inner plies compared to outer plies.

In another embodiment, the wing panel structure may be substantially completely assembled and then cured or processed in one step. In this embodiment, the final assembly may be cured or processed to the higher strength specification.

Figure 5:
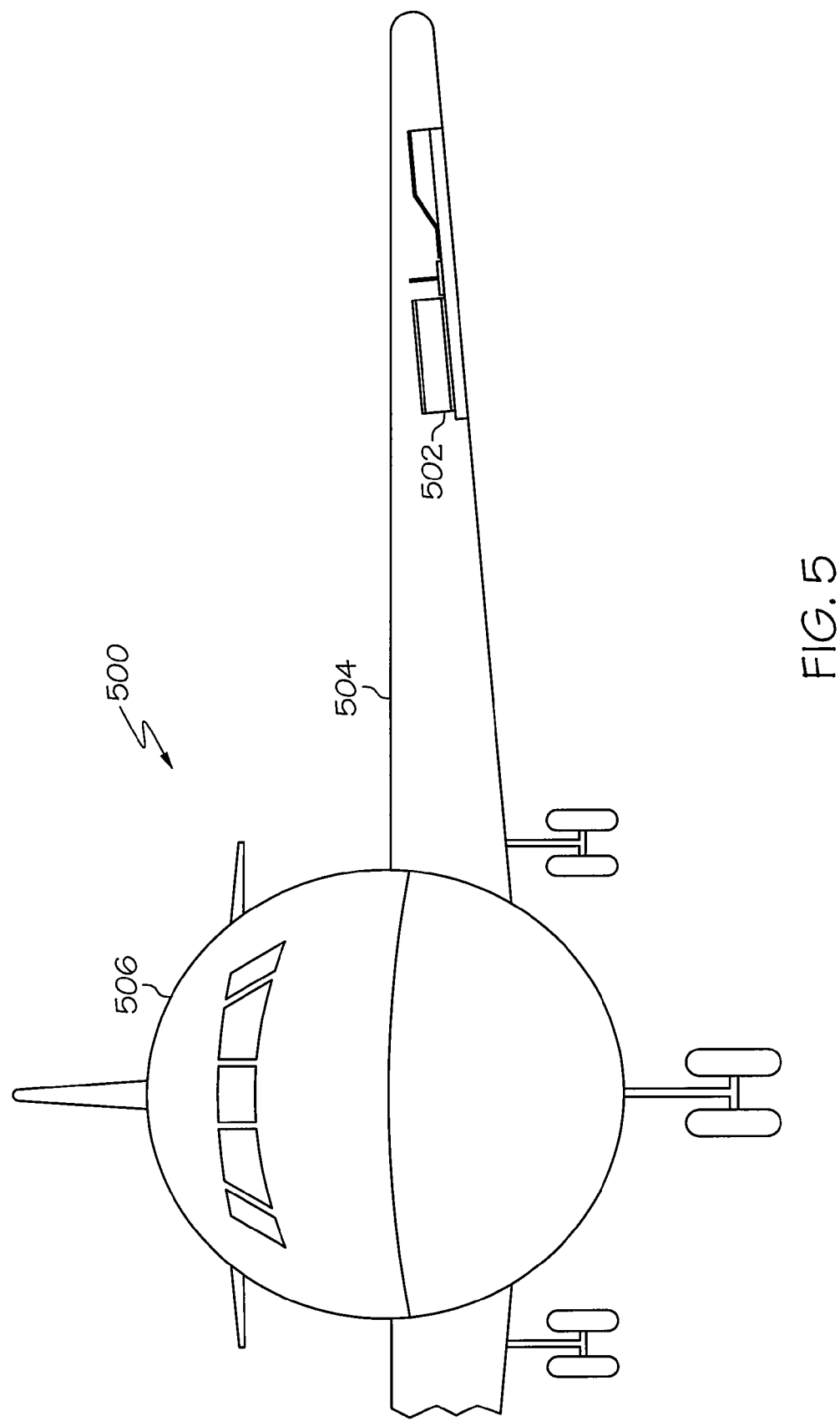
FIG. 5 is an illustration of an example of an aircraft including a wing panel structure in accordance with an embodiment of the present invention.

FIG. 5 is an illustration of an example of an aircraft 500 including a wing panel structure 502 in accordance with an embodiment of the present invention. The wing panel structure 502 may have a structure similar to the wing panel structure 100 of FIG. 1. The wing panel structure 502 may form part of a wing 504 of the aircraft 500. The wing 504 may extend from a fuselage 506 of the aircraft 500. The wing panel structure 502 is not necessarily to scale and merely illustrates how the wing panel structure 502 may be used in forming the wing 504. The wing may include a plurality of such panels.

The block diagrams in the Figures illustrate the architecture, functionality, and operation of possible implementations of systems and methods according to various embodiments of the present invention. In this regard, each block in the block diagrams may represent a module, component, element or segment. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems which perform the specified functions or acts, or combinations of special purpose hardware.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A panel structure for an aerospace vehicle, comprising:
a first portion of the panel structure;
a second portion of the panel structure;
an outer layer of material having a predetermined thickness and extending across both the first portion and the second portion of the panel structure;
a core structure placed on the outer layer of material and included in the first portion of the panel structure;
an inner layer of material formed at least on the core structure, wherein the inner layer of material has a selected thickness less than the predetermined thickness of the outer layer of material;
a stiffener formed on the outer layer of material and included in the second portion of the panel structure, wherein the stiffener has a predetermined structural shape comprising a flange formed on the outer layer and a member extending from the flange on an opposite side from the outer layer; and
a support rib formed on the inner layer of material between the stiffener and an assembly including the core structure and the inner layer of material, wherein the inner layer of material extends under the support rib and overlaps a portion of the flange of the stiffener.

2. The panel structure of claim 1, wherein the outer layer of material comprises a structure to predominantly support a load.

3. The panel structure of claim 1, wherein the outer layer of material comprises a multiplicity of plies of material.

4. The panel structure of claim 3, wherein the multiplicity of plies of material are cured and processed to a higher strength specification than the core structure and the inner layer of material, wherein the higher strength specification comprises a curing temperature above about 300 degrees F. and a pressure above about 80 psi.

5. The panel structure of claim 3, wherein the multiplicity of plies of material comprise a multiplicity of epoxy unidirectional tape plies.

6. The panel structure of claim 3, wherein the plies of material are continuous for an extent of the panel.

7. The panel structure of claim 1, further comprising a layer of a non-destructive inspection (NDI) reflective material formed between the outer layer of material and the core structure.

8. The panel structure of claim 1, wherein the core structure comprises a honeycomb type structure.

9. The panel structure of claim 1, wherein the outer layer, the core structure and the inner layer are cured at a curing temperature between about 300 and about 400 degrees F. and a pressure between about 80 and about 100 psi.

10. The panel structure of claim 1, wherein the inner layer of material comprises a plurality of plies of a fabric.

11. The panel structure of claim 1, wherein the stiffener includes a group comprising an I section stiffener and a T section stiffener.

12. The panel structure of claim 1, wherein the stiffener is inboard of the assembly including the core structure and the inner layer of material.

13. A panel structure for an aerospace vehicle, comprising:
a first portion of the panel structure;
a second portion of the panel structure;
an outer layer of material having a predetermined thickness and extending across both the first portion and the second portion of the panel structure;
a core structure placed on the outer layer of material and included in the first portion of the panel structure;
an inner layer of material formed at least on the core structure;
a stiffener placed on the outer layer and included in the second portion of the panel structure, wherein the stiffener has a predetermined structural shape comprising a flange formed on the outer layer and a member extending from the flange on an opposite side from the outer layer; and
a support rib placed on the inner layer of material between the stiffener and an assembly including the core structure and the inner layer of material, wherein the inner layer of material extends under the support rib and overlaps a portion of the flange of the stiffener.

14. The panel structure of claim 13, wherein the outer layer of material comprises a structure to predominantly support a load.

15. The panel structure of claim 13, wherein the outer layer of material comprises a multiplicity of plies of material.

16. The panel structure of claim 15, wherein the multiplicity of plies of material are cured and processed to a higher strength specification than the core structure and inner layer of material, wherein the higher strength specification comprises a curing temperature above about 300 degrees F. and a pressure above about 80 psi.

17. The panel structure of claim 13, further comprising a layer of a non-destructive inspection (NDI) reflective material disposed between the outer layer of material and the core structure.

18. The panel structure of claim 13, wherein the core structure comprises a honeycomb type structure.

19. The panel structure of claim 13, wherein the stiffener comprises a stringer of composite material.

20. The panel structure of claim 13, wherein the stiffener is inboard of the assembly including the core structure and the inner layer of material.

21. An aerospace vehicle, comprising:
a fuselage; and
an airfoil extending from the fuselage, wherein the airfoil includes at least one panel structure, the at least one panel structure including:
first portion of the panel structure;
second portion of the panel structure;
an outer layer of material having a predetermined thickness and extending across both the first portion and the second portion of the panel structure;
a core structure placed on the outer layer of material and included in the first portion of the wing panel structure;
an inner layer of material formed at least on the core structure, wherein the inner layer of material has a selected thickness less than the predetermined thickness of the outer layer of material; and
a stiffener formed on the outer layer of material and included in the second portion of the wing panel structure, wherein the stiffener has a predetermined structural shape comprising a flange formed on the outer layer and a member extending from the flange on an opposite side from the outer layer; and a support rib formed on the inner layer of material between the stiffener and an assembly including the core structure and the inner layer of material, wherein the inner layer of material extends under the support rib and overlaps a portion of the flange of the stiffener.

22. The aerospace vehicle of claim 21, wherein the outer layer of material of the at least one panel structure comprises a structure to predominantly support a load.

23. The aerospace vehicle of claim 21, wherein the outer layer of material of the at least one panel structure comprises a multiplicity of plies of material and wherein the multiplicity of plies of material are cured and processed to a higher strength specification than the core structure, wherein the higher strength specification comprises a curing temperature above about 300 degrees F. and a pressure above about 80 psi.

24. The aerospace vehicle of claim 21, further comprising a layer of a non-destructive inspection (NDI) material disposed between the outer layer of material and the core structure of the at least one panel structure.

25. The aerospace vehicle of claim 21, wherein the core structure of the at least one panel structure comprises a honeycomb type structure.

26. A method of making a panel structure for an aerospace vehicle, comprising:
  forming an first portion of the panel structure;
  forming a second portion of the panel structure;
  forming an outer layer of material having a predetermined thickness and extending across both the first portion and the second portion of the panel structure;
  placing a core structure on at least a portion of the outer layer of material to form the first portion of the panel structure;
  forming an inner layer of material disposed at least on the core structure, wherein the inner layer of material has a selected thickness less than the predetermined thickness of the outer layer of material;
  disposing a stiffener on the outer layer of material to form the second portion of the panel structure, wherein the stiffener has a predetermined structural shape comprising a flange formed on the outer layer and a member extending from the flange on an opposite side from the outer layer; and
  forming a support rib on the inner layer of material between the stiffener and an assembly including the core structure and the inner layer of material, wherein the inner layer of material extends under the support rib and overlaps a portion of the flange of the stiffener.

27. The method of claim 26, wherein forming the outer layer of material comprises forming a structure to predominantly support a load.

28. The method of claim 26, wherein forming the outer layer of material comprises:
  depositing a multiplicity of plies of material;
  curing and processing the multiplicity of plies of material to a higher strength specification than the core structure and inner layer of material, wherein the higher strength specification comprises a curing temperature above about 300 degrees F. and a pressure above about 80 psi.

29. The method of claim 28, wherein the multiplicity of plies of material of the outer layer of material are cured and processed before the core structure and inner layer of material are disposed on the panel structure.

30. The method of claim 26, further comprising forming a layer of NDI reflective material between the outer layer of material and the core structure.

31. The method of claim 26, wherein placing the core structure comprises placing a honeycomb type structure.

32. The method of claim 26, wherein forming the inner layer of material comprises laying a plurality of plies of a fabric.

33. The method of claim 26, further comprising curing the panel structure after forming the inner layer of material.

34. The method of claim 33, wherein curing the panel structure comprises applying a temperature between about 300 and about 400 degrees F. and a pressure between about 80 and about 100 psi.

* * * * *